(12) United States Patent
Limpert

(10) Patent No.: US 8,905,692 B2
(45) Date of Patent: Dec. 9, 2014

(54) DEVICE FOR FASTENING A FIRST COMPONENT ON A SECOND COMPONENT

(75) Inventor: Alexander Limpert, Weikersheim (DE)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 13/982,268

(22) PCT Filed: Jan. 26, 2012

(86) PCT No.: PCT/US2012/022763
§ 371 (c)(1),
(2), (4) Date: Jul. 28, 2013

(87) PCT Pub. No.: WO2012/103362
PCT Pub. Date: Aug. 2, 2012

(65) Prior Publication Data
US 2013/0315691 A1 Nov. 28, 2013

(30) Foreign Application Priority Data
Jan. 27, 2011 (DE) .................. 10 2011 010 037

(51) Int. Cl.
*F16B 37/00* (2006.01)
*F16B 37/04* (2006.01)
*F16B 33/00* (2006.01)

(52) U.S. Cl.
CPC ............... *F16B 37/04* (2013.01); *F16B 37/005* (2013.01); *F16B 33/00* (2013.01); *F16B 37/042* (2013.01); *Y10S 411/907* (2013.01)
USPC ............................ 411/104; 411/512; 411/907

(58) Field of Classification Search
CPC ...... F16B 12/14; F16B 19/002; F16B 21/125; F16B 23/00; F16B 33/004; F16B 37/08; F16B 37/0842; F16B 37/044; F16B 37/045; F16B 37/047

USPC ......... 411/103, 104, 108, 113, 432, 511, 512, 411/516, 900, 907
See application file for complete search history.

(56) References Cited

U.S. PATENT DOCUMENTS 3,469,493 A 9/1969 Fisher
3,534,797 A * 10/1970 Haug et al. .................. 411/108
(Continued)

FOREIGN PATENT DOCUMENTS

DE 19652874 C1 4/1998
DE 102005032699 A1 1/2007
GB 1245868 A 9/1971

OTHER PUBLICATIONS

International Search Report and Written Opinion corresponding to PCT/US2012/022763 dated May 29, 2012.

*Primary Examiner* — Roberta Delisle
(74) *Attorney, Agent, or Firm* — Lowe Hauptman & Ham LLP

(57) ABSTRACT

Device for fastening a first component (42) with a through opening (44) on a second component (40) with a through opening (18) being essentially rectangular in cross section, comprising a first fastening element (10) which comprises a radial flange (12) on one end and a shaft section (16) with rectangular cross section, which is insertable into the through opening of the second component and comprising a second fastening element which relative to the first fastening element is at least partly axially moveable, which second fastening element comprises an axial bore for receiving a fastening screw. The first fastening element comprises at least one first section (18) of a first, harder material and at least one second section (20) of a second, softer material, wherein the second fastening element upon screwing the fastening screw is pressed against the second section of the first fastening element and thereby deforming it in a sealing manner.

15 Claims, 4 Drawing Sheets

(56) References Cited

U.S. PATENT DOCUMENTS

Figure 5:
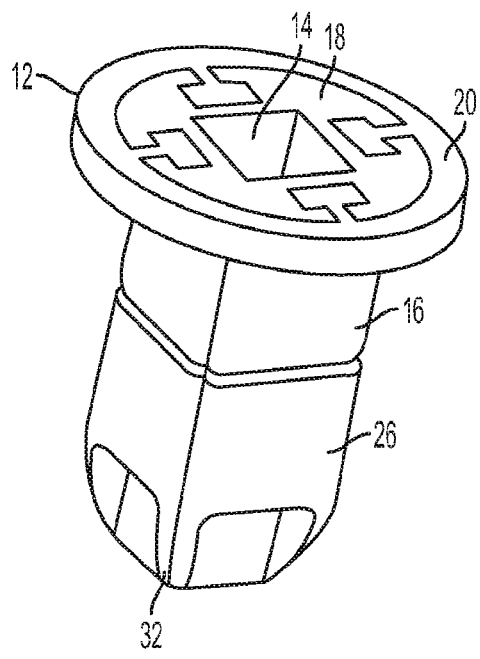

| | | | |
|---|---|---|---|
| 3,739,684 A * | 6/1973 | Vitkevich | 411/49 |
| 4,089,496 A * | 5/1978 | Mizusawa | 248/56 |
| 5,375,954 A * | 12/1994 | Eguchi | 411/48 |
| 5,636,953 A | 6/1997 | Jaeger et al. | |
| 6,048,147 A * | 4/2000 | Arisaka et al. | 411/48 |
| 6,416,267 B1 * | 7/2002 | Nehl | 411/80.5 |
| 6,560,819 B2 * | 5/2003 | Mizuno et al. | 16/2.2 |
| 2008/0193251 A1 | 8/2008 | Sbongk | |

* cited by examiner

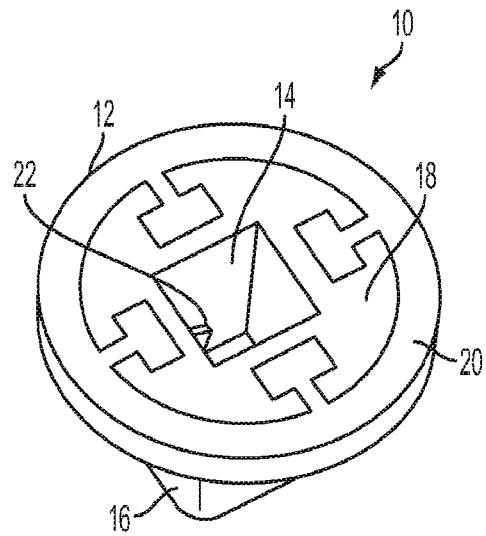
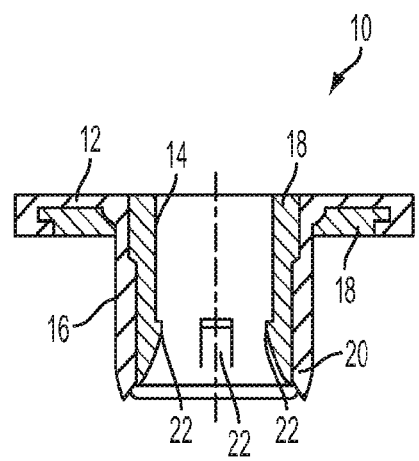
FIG. 1    FIG. 2
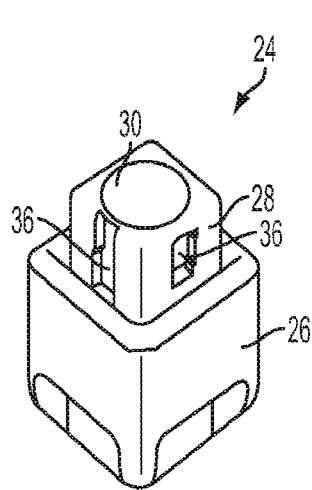
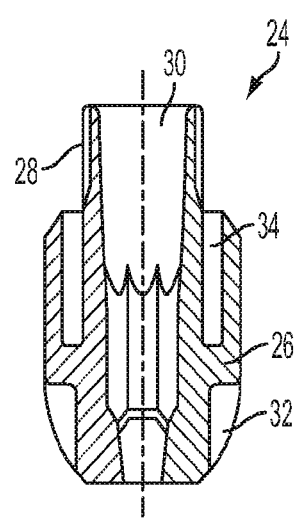
FIG. 3    FIG. 4

DEVICE FOR FASTENING A FIRST COMPONENT ON A SECOND COMPONENT

RELATED APPLICATIONS

This application is a National Phase of International Application Number PCT/US2012/022763, filed Jan. 26, 2012 and claims the benefit of German application 102011010037.7 filed Jan. 27, 2011.

The invention relates to a device for fastening a first component with a through opening on a second component with a through opening being essentially rectangular in cross section, comprising a first fastening element which comprises a radial flange on one end and a shaft section with rectangular cross section, which is insertable into the through opening of the second component, wherein the flange abuts against a surface of the second component, and comprising a second fastening element which, relative to the first fastening element, is at least partly axially moveable, but borne torque proof, which second fastening element comprises an axial bore for receiving a fastening screw guided through the through opening of the first component being placed against the flange of the first fastening element and through the flange of the first fastening element.

These types of devices serve, for example, for fastening cowling parts to body parts of automotive vehicles. DE 10 2005 032 699 B4 makes known a fastening device with a cage part, which comprises a radial flange at one end and a shaft section with a rectangular cross section, which is insertable into the through opening of the second component and with a female part which is received at least partially by the cage part so as to be axially movable and is rotatable from a first rotary position in the cage part into a second rotary position, and which additionally comprises an axial bore for receiving a fastening screw. The female part, over and above this, comprises wing sections on the outer side which, in the first rotary position, lie within the contour of the cage part and in the second rotary position, abutting against a stop member of the cage part, project beyond the contour of the cage part in a radial manner. Using the known device, components with high retaining forces are able to be connected together. However, sometimes as extensive a degree of water tightness as possible is also required.

Proceeding from the prior art explained, the object underlying the invention is to provide a device of the aforementioned type, with which as extensive a degree of water tightness as possible is achieved with high retaining forces in operation and at the same time simple assembly.

This object is achieved by the invention by the object of Claim 1. Advantageous developments are to be found in the dependent claims, the description and the figures.

For a device of the aforementioned type, the object is achieved by the invention in that the first fastening element comprises at least one first section of a first, harder material and at least one second section of a second, softer material, wherein the second fastening element upon screwing the fastening screw into its axial bore is pressed against the second section of the first fastening element and thereby deforms the same such that the second section abuts in a sealing manner on the surfaces delimiting the through opening of the second component.

Using the device as claimed in the invention, two components, which each have a through opening, are able to be connected together. The first component can be a cowling part or cowling plate of an automotive vehicle, for example. The second component can be a body part or body sheet of an automotive vehicle on which the cowling part or cowling plate is to be fastened. The through opening of the second component is rectangular, just as the shaft section of the first fastening element. In this context, the word 'rectangular' naturally also includes 'square' as in the case below. The shaft section is held in an extensively non-rotational manner in the through opening of the second component. To this end, it is possible for the cross section of the shaft section, for example, to be only slightly smaller than the cross section of the through opening. The flange of the first fastening element also comprises a through opening. In the state with the second component inserted through the through opening, the through opening of the flange coincides with the through opening of the second component. Once the first fastening element has been inserted through the through opening of the second component by way of its shaft section, the first component is placed against the side of the flange remote from the second component such that the through opening of the first component also coincides with the opening of the flange. Subsequently, from the side of the first component remote from the flange, a fastening screw is able to be screwed through the through openings of the first component, the flange and the second component into the axial bore of the second fastening element.

The fastening screw can also be part of the device as claimed in the invention. When the fastening screw is screwed in, the second fastening element, as a result of the non-rotational bearing arrangement on the first fastening element, is drawn against the first fastening element. The axial bore of the second fastening element can comprise an internal thread for the fastening screw. However, it is also conceivable for such an internal thread to be formed when the fastening screw is screwed in the axial bore or for the axial bore to comprise suitable locking elements for the fastening screw. The fastening elements are therefore drawn in relation to each other when the fastening screw is screwed in. In this case, this results in an especially squeezing deformation of the second soft section of the first fastening element as a result of the fastening element abutting against said second soft section of the first fastening element. The soft section of the first fastening element, in this case, is pressed in such a manner between the second component and the fastening element that it seals off the through opening of the second component for example in a fluid-tight manner, in particular in a water-tight manner. The second section, in this case, is placed into possible spaces around the through opening of the second component. In particular, the softer section can abut against the top side and bottom side of the second component delimiting the through opening and the edge of the through opening. The softer section, in this case, can also abut against the bottom side of the first component. The decisive fact is that a passage of, for example, water through the through opening of the second component is prevented in the definitively assembled state of the device.

As claimed in the invention, the second, softer section of the first fastening element is therefore utilized as a sealing compound, the sealing taking place only as a result of the screwing in of the fastening screw and the resultant relative movement between first and second fastening element. This means that, on the one hand, an extensive a seal as possible for example against water is obtained in the fastened state. On the other hand, through the squeezing deformation of the softer, second section of the first fastening element, high tolerance compensation with regard to variously thick components or other component tolerances is achieved. At the same time, the assembly is simple and high retaining forces are achieved in operation.

The first material can be a plastic material, a rubber or a metal. As an alternative or in addition to this, the second material can be a plastic material or a rubber. As claimed in a development that is particularly suitable in practice, the fastening element can be received in the first fastening element so as to be at least partially axially moveable but torque proof. To this end, the second fastening element can comprise a bore section comprising the axial bore which is received in the shaft section of the first fastening element. For example, the shaft section of the first fastening element can comprise a through opening which is rectangular in cross section, into which the bore section of the second fastening element, also being rectangular in cross section, is then inserted. By adapting the rectangular cross sections in a suitable manner, for example by the cross section of the bore section of the second fastening element being only slightly smaller than the cross section of the through opening of the shaft section of the first fastening element, a non-rotational reception can then be achieved. The reception of the second fastening element in the first fastening element results in a particularly well guided and consequently reliable assembly.

As claimed in a further development, it can be provided that the shaft section, being rectangular in cross section, of the first fastening element, is at least in sections formed by the second section of softer material and that the second fastening element also comprises a shaft section being rectangular in cross section and attached to the bore section, which shaft section abuts at least on the second section of the first fastening element of the softer material when the bore section of the second fastening element is received in the shaft section of the first fastening element and before screwing in of the fastening screw. For example, the surface layer of the shaft section can consist of softer material. The shaft section of the second fastening element can then abut in a corresponding manner against said softer surface layer such that said softer layer is deformed to form the desired seal when the fastening elements are drawn together. Naturally, it is also possible for the entire shaft section of the first fastening element to consist of softer material. The fastening screw can also consist of plastic material or metal.

The second fastening element can also consist of plastic material or metal. It can consist of a material that is harder than that of the second section of the first fastening element. For example, the second fastening element can consist of the same material as the first section of the first fastening element. In addition, it can be provided that at least the shaft section being rectangular in cross section of the second fastening element consists at least in sections of a harder material than the second section of the first fastening element.

The first and/or the second fastening element can be produced in an injection moulding process. In particular, the first fastening element can be produced in a two component injection moulding process that is known per se.

As claimed in a further development, the second section of the first fastening element can be deformed in such a manner upon screwing in of the fastening screw that it forms a form-fit connection between the device and the second component. To produce the form-fit connection, the soft section can be placed about the edge of the through opening of the second component. Such a form-fit increases the retaining force of the device in operation.

In addition, preliminary connection means can be provided with which the first and second fastening element can be preliminarily connected together before screwing in of the fastening screw. The preliminary connecting means can comprise a locking connection. An advantage of this development is that the fastening devices can be transported to the respective assembly site in a captive manner as well they are able to be retained in a captive manner when the fastening screw is screwed into the device. This applies in particular to overhead assembly. The fastening elements can comprise suitable locking projections and locking receptions for the locking connection.

As claimed in a further development, it can be provided that the second fastening element comprises at least one reception in which the first section of the first fastening element is at least in sections received upon screwing in of the fastening screw or that the first fastening element comprises at least one reception, in which the second fastening element is received at least in sections upon screwing in of the fastening screw. The at least one reception can comprise at least one reception groove, preferably several reception grooves. In this way, guiding of the fastening elements when screwing in the fastening screw is achieved. A many-sided groove, for example a square groove, can be provided as reception groove. Such a reception also improves the transmission of torque between the fastening elements when screwing in the fastening screw.

In addition, holding means can be provided with which the first fastening element is preliminarily held on the second component in the state being inserted through the through opening of the second component. The holding means can comprise locking means. Using such holding means, the device is held on the second component before the fastening screw is inserted. This facilitates the assembly. Locking projections can also be provided on the shaft section of the first fastening element, said locking projections locking on the through opening of the second component to provide the preliminary hold.

Figure 6:
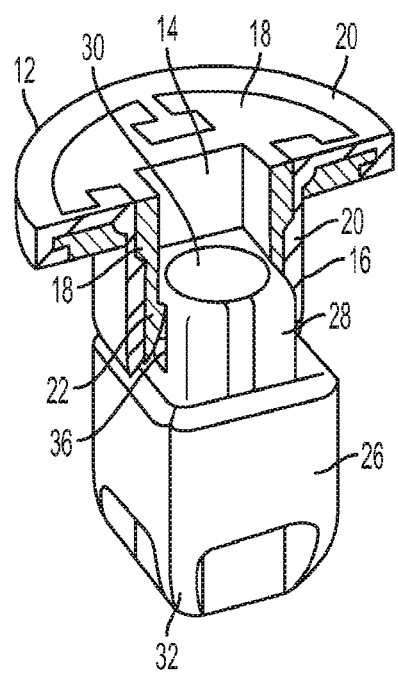
Figure 7:
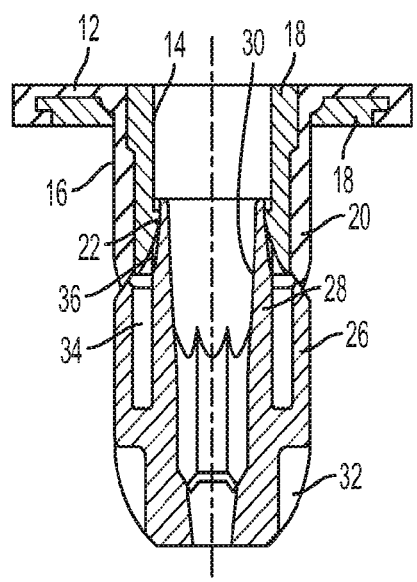
Figure 8:
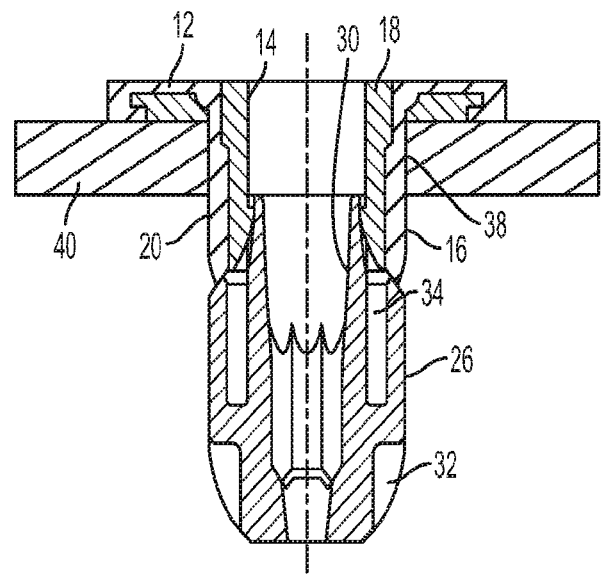
Figure 9:
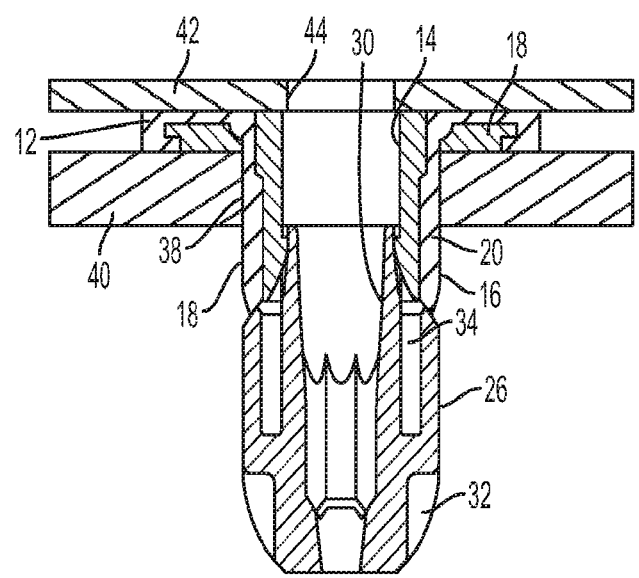
Figure 10:
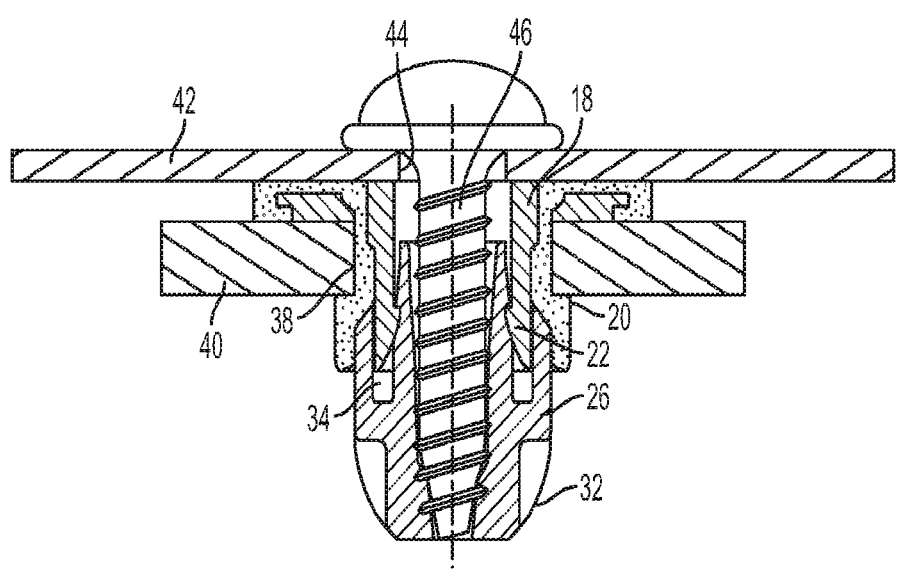

An exemplary embodiment of the invention is explained in detail below by way of figures, in which, in a schematic manner:

FIG. 1 shows a perspective view of a first fastening element of a device as claimed in the invention, FIG. 2 shows a sectional view of the first fastening element from FIG. 1, FIG. 3 shows a perspective view of a second fastening element of a device as claimed in the invention, FIG. 4 shows a sectional view of the second fastening element from FIG. 3, FIG. 5 shows a perspective view of the first and second fastening element from FIGS. 1 to 4 in a first operating state, FIG. 6 shows a part-sectioned view of the representation from FIG. 5, FIG. 7 shows a sectional view of the representation from FIG. 5, FIG. 8 shows a sectional view of the first and second fastening element from FIGS. 1 to 7 in a second operating state, FIG. 9 shows a sectional view of the first and second fastening element from FIGS. 1 to 7 in a third operating state, FIG. 10 shows a sectional view of the first and second fastening element from FIGS. 1 to 7 in a fourth operating state.

In so far as nothing else is specified, identical references in the figures refer to identical objects. FIGS. 1 and 2 show a first fastening element 10 of a device as claimed in the invention. The fastening element 10 comprises a radial flange 12 with a circular cross section and a central through opening 14 that is square in cross section. A shaft section 16 that is also square in cross section extends out from the flange 12. The through opening 14, in this case, also extends through the shaft section 16. As can be seen in FIGS. 1 and 2, the first fastening element 10 consists of two sections, namely a first section 18 which is produced from a harder plastic material and is shown in a tightly hatched manner as an example in FIG. 2, and a second section 20 which is produced from a softer plastic material and is shown with wide hatching in FIG. 2. The first fastening element 10 has been produced in a two component injection moulding process. It can be seen in particular in the sectional view in FIG. 2, that the shaft section 16, in the region of its free end, comprises locking projections 22 situated opposite each other in pairs, said locking projections being realized in the region of the first, harder section 18.

A second fastening element 24 of the device as claimed in the invention is shown in FIGS. 3 and 4. The second fastening element 24 has a shaft section 26 that is also square in cross section and a bore section 28, which extends through said shaft section and also has a square cross section. An axial bore 30, which, for example, can comprise an internal thread, extends through the bore section 28. The shaft section 26 tapers at its free end remote from the bore section 28 into a tapering section 32. A reception groove 34 which is realized as a square is realized between the bore section 28 and the shaft section 26. It can also be seen from FIGS. 1 to 4 that the cross section of the bore section 28 is slightly smaller than the cross section of the through opening 14 of the first fastening element 10. Over and above this, a total of four locking receptions 36 situated opposite each other in pairs are realized on the four outer sides of the bore section 28. In addition, it can be seen from FIGS. 1 to 4 that the cross section of the shaft section 26 of the second fastening element 24 essentially corresponds to the cross section of the shaft section 16 of the first fastening element 10. The second fastening element 24 is also produced in a plastic material injection moulding process and consists, in the example shown, of the same harder plastic material as the first section 18 of the first fastening element 10.

FIGS. 5 to 7 show different views of the fastening elements 10, 24 from FIGS. 1 to 4 in a pre-mounted state. To this end, the second fastening element 24 has been inserted by way of its bore section 28 into the through opening 14 of the first fastening element 10. The locking projections 22 of the first fastening element 10, in this case, move into locking engagement with the locking receptions 36 of the second fastening element 24, such that the fastening elements 10, 24 in the state shown in FIGS. 5 to 7 are preliminarily connected together. In addition, it can be seen that the outer surface layer of the shaft 16 of the first fastening element 10 is formed by the second section 20 with the softer plastic material and that in the preliminarily connected-together state of the fastening elements 10, 24, the shaft section 26 of the harder plastic material of the second fastening element 24 abuts on the second, softer section 20 of the first fastening element 10.

In the preliminarily connected-together state, the fastening elements 10, 24 are inserted into a through opening 38, being square in cross section, of a second component 40, for example of a body part of an automotive vehicle, as can be seen in FIG. 8. In this state, the flange 12 abuts by way of its bottom side on the top side of the second component 40. The cross section of the through opening 38 of the second component 40, in this case, is only slightly larger than the cross section of the shaft sections 16, 26 of the fastening elements 10, 24. The fastening elements 10, 24 in the state shown in FIG. 8 are consequently held in a captive manner in the through opening 38 of the second component 40. To continue assembly, a first component 42, for example a cowling part of an automobile, is then placed onto the top side of the flange 12 such that a through opening 44 of the first component 42 coincides with the through opening 14 of the first fastening element 10 and the axial bore 30 of the second fastening element 24, as shown in FIG. 9. The first component 42, in this case, is placed onto the top side of the flange 12. To fasten the first component 42 on the second component 40, a fastening screw 46 is then screwed in through the through opening 44 of the first component 42 and the through opening 14 of the first fastening element 10 into the axial bore 30 of the second fastening element 24, as can be seen in FIG. 10. As a result of the non-rotational reception of the second fastening element 24 in the first fastening element 10 and as a result of the non-rotational reception of the fastening elements 10, 24 in the through opening 38 of the second components 40, in the course of screwing in the fastening screw 46, the second fastening element 24 is drawn against the first fastening element 10. In this case, this results, on the one hand, in an entry of the shaft section 16, formed from the first, harder plastic material, of the first fastening element 10 into the reception groove 34 of the second fastening element 24. This means that, once again, the transmission of torque between the fastening elements 10, 24 is improved when the fastening screw 46 is screwed in. At the same time, when the fastening screw 46 is being screwed in, the shaft section 26 of the harder plastic material is pushed against the second section 20 of the shaft section 16 of the first fastening element 10 made of the softer plastic material. This results in a squeezing deformation of the second section 20, as shown in FIG. 10, where the squeezed and deformed second section 20 is shown filled out in black for reasons of representation.

At the same time, through their engagement in the locking recesses 36, the locking projections 22 also increase the transmission of torque when the fastening screw 46 is screwed in. When the shaft section 26 of the second fastening element 24 reaches the vicinity of the bottom surface of the second component 40, the clamping force rises and the second, softer section 20 is pressed onto the bottom surface of the second component 40. In the definitively assembled state shown in FIG. 10, the second, softer section 20 forms a seal against water, said seal abutting against the through opening 38 of the second component 40 from the top and the bottom side and in particular also extending along the edge of the through opening 28. Apart from a sealing function, a form-fit between the device as claimed in the invention, in particular the second section 20, and the second component 40 is achieved at the same time in this way. This increases the retaining forces of the device in operation.

The invention claimed is:

1. Device for fastening a first component with a through opening on a second component with a trough opening being essentially rectangular in cross section, comprising a first fastening element which comprises a radial flange on one end and a shaft section with rectangular cross section, which is insertable into the through opening of the second component, wherein the flange abuts against a surface of the second component, and comprising a second fastening element which relative to the first fastening element is at least partly axially moveable, but borne torque proof, which second fastening element comprises an axial bore for receiving a fastening screw guided through the through opening of the first component being placed against the flange of the first fastening element and through the flange of the first fastening element, wherein the first fastening element comprises at least one first section of a first, harder material and at least one second section of a second, softer material, wherein the second fastening element upon screwing the fastening screw into its axial bore is pressed against the second section of the first fastening element and thereby deforms the same such that the second section abuts in a sealing manner on the surface delimiting the through opening of the second component.

2. Device according to claim 1, wherein the first material is a plastic material, a rubber or a metal and/or that the second material is a plastic material or a rubber.

3. Device according to claim 1, wherein the second fastening element is received in the first fastening element at least partially axially moveable but torque proof.

4. Device according to claim 3, wherein the second fastening element comprises a bore section comprising the axial bore which is received in the shaft section of the first fastening element.

5. Device according to claim 4, wherein the shaft section of the first fastening element being rectangular in cross section, is at least in sections formed by the second section of a softer material and, that the second fastening element also comprises a shaft section being rectangular in cross section and attached to the bore section, which shaft section abuts at least on the second section of the first fastening element of the softer material when the bore section of the second fastening element is received in the shaft section of the first fastening element and before screwing in of the fastening screw.

6. Device according to claim 5, wherein at least the shaft section being rectangular in cross section of the second fastening element consists at least in sections of a harder material than the second section of the first fastening element.

7. Device according to claim 1, wherein the second fastening element consist of a plastic material or a metal.

8. Device according to claim 1, wherein the first fastening element is produced in a two component injection moulding process.

9. Device according to claim 1, wherein the second section of the first fastening element is deformed such upon screwing in of the fastening screw that it forms a form-fit connection between the device and the second component.

10. Device according to claim 1, wherein preliminary connection means are provided with which the first and second fastening element can be preliminarily connected together before screwing in of the fastening screw.

11. Device according to claim 10, wherein the preliminary connecting means comprise a locking means.

12. Device according to claim 1, wherein the second fastening element comprises at least one reception in which the first section of the first fastening element is at least in sections received upon screwing in of the fastening screw or, that the first fastening element comprises at least one reception, in which the second fastening element is received at least in sections upon screwing in of the fastening screw.

13. Device according to claim 12, wherein the at least one reception comprises at least one reception groove preferably several reception grooves.

14. Device according to claim 1, wherein holding means are provided with which the first fastening element is preliminarily held on the second component in the state being inserted through the through opening of the second component.

15. Device according to claim 14, wherein the holding means comprise locking means.

* * * * *